United States Patent
Ito

(10) Patent No.: US 9,769,839 B2
(45) Date of Patent: Sep. 19, 2017

(54) WIRELESS COMMUNICATION WITH MULTIPLE ACCESS POINTS

(71) Applicant: FUJITSU LIMITED, Kawasaki-shi, Kanagawa (JP)

(72) Inventor: Akira Ito, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 240 days.

(21) Appl. No.: 13/630,907

(22) Filed: Sep. 28, 2012

(65) Prior Publication Data

US 2014/0092816 A1 Apr. 3, 2014

(51) Int. Cl.
*H04L 12/28* (2006.01)
*H04W 72/12* (2009.01)

(52) U.S. Cl.
CPC .................... *H04W 72/12* (2013.01)

(58) Field of Classification Search
USPC ....... 370/229, 230, 235, 252, 255, 328–330, 370/349, 394, 395.4
See application file for complete search history.

(56) References Cited

U.S. PATENT DOCUMENTS

| | | | |
|---|---|---|---|
| 2006/0056354 A1* | 3/2006 | Vasudevan | H04W 72/042 370/332 |
| 2010/0124188 A1* | 5/2010 | Wu | 370/328 |
| 2011/0243102 A1 | 10/2011 | Sebire et al. | |
| 2012/0230272 A1* | 9/2012 | Kim et al. | 370/329 |
| 2012/0327910 A1* | 12/2012 | Dalsgaard et al. | 370/335 |
| 2013/0250925 A1* | 9/2013 | Lohr et al. | 370/336 |

FOREIGN PATENT DOCUMENTS

| | | |
|---|---|---|
| WO | 2011/086228 A1 | 7/2011 |
| WO | 2012/041422 A2 | 4/2012 |

OTHER PUBLICATIONS

International Search Report dated Dec. 12, 2013 in application No. PCT/US2013/061008.
3GPP RWS-120003, "LTE Release 12 and Beyond", Ljubljana, Slovenia, Jun. 11-12, 2012.
3GPP RWS-120010, "Requirements, Candidate Solutions & Technology Roadmap for LTE Rel-12 Onward", NTT Docomo, Inc., Ljubljana, Slovenia, Jun. 11-12, 2012.
(Continued)

*Primary Examiner* — Yemane Mesfin
*Assistant Examiner* — Mon Cheri Davenport
(74) *Attorney, Agent, or Firm* — Maschoff Brennan

(57) ABSTRACT

A wireless device that includes a receiver to receive data transmission scheduling information from a first wireless communication access point and to receive data from a second wireless communication access point according to the data transmission scheduling information. The wireless device may also include a request generator to generate a data transmission request based on the data transmission scheduling information and a transmitter to transmit the data transmission request to the second wireless communication access point. The receiver may receive the data from the second wireless communication access point in response to the data transmission request.

18 Claims, 8 Drawing Sheets

(56) References Cited

OTHER PUBLICATIONS

3GPP TS 36.300 V11.2.0, "3rd Generation Partnership Project; Technical Specification Group Radio Access Network; Evolved Universal Terrestrial Radio Access (E-UTRA) and Evolved Universal Terrestrial Radio Access Network (E-TRAN); Overall description; Stage 2 (Release 11)" Jun. 27, 2012.

3GPP TS 36.211 V11.0.0, "3rd Generation Partnership Project; Technical Specification Group Radio Access Network; Evolved Universal Terrestrial Radio Access (E-UTRA) and Evolved Universal Terrestrial Radio Access Network (E-TRAN); Physical Channels and Modulation (Release 11)" Sep. 18, 2012.

3GPP TS 36.212 V11.0.0, "3rd Generation Partnership Project; Technical Specification Group Radio Access Network; Evolved Universal Terrestrial Radio Access (E-UTRA) and Evolved Universal Terrestrial Radio Access Network (E-TRAN); Multiplexing and channel coding (Release 11)" Sep. 18, 2012.

3GPP Ts 36.213 V11.0.0, "3rd Generation Partnership Project; Technical Specification Group Radio Access Network; Evolved Universal Terrestrial Radio Access (E-UTRA) and Evolved Universal Terrestrial Radio Access Network (E-TRAN); Physical layer procedures (Release 11)" Sep. 18, 2012.

\* cited by examiner

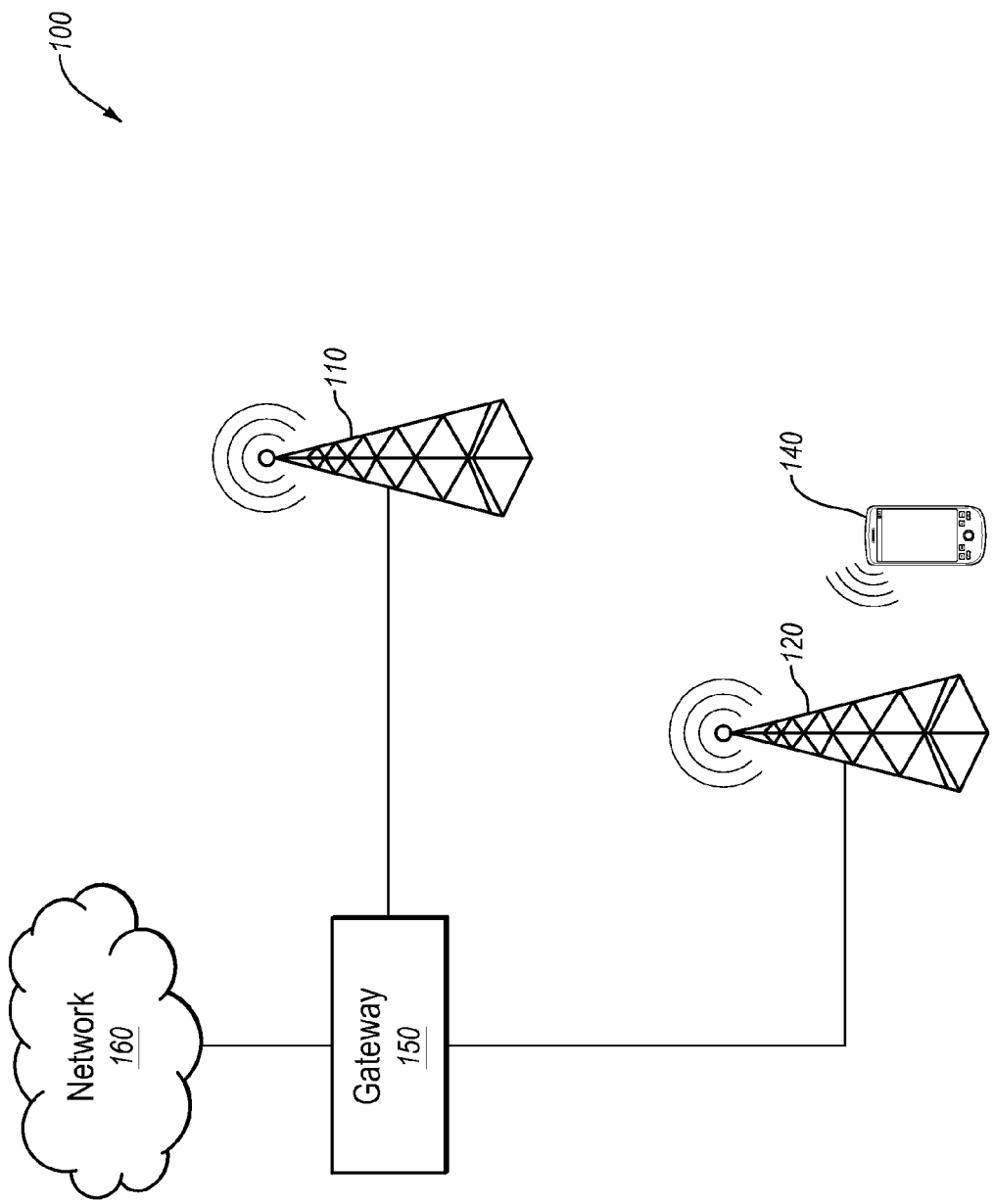

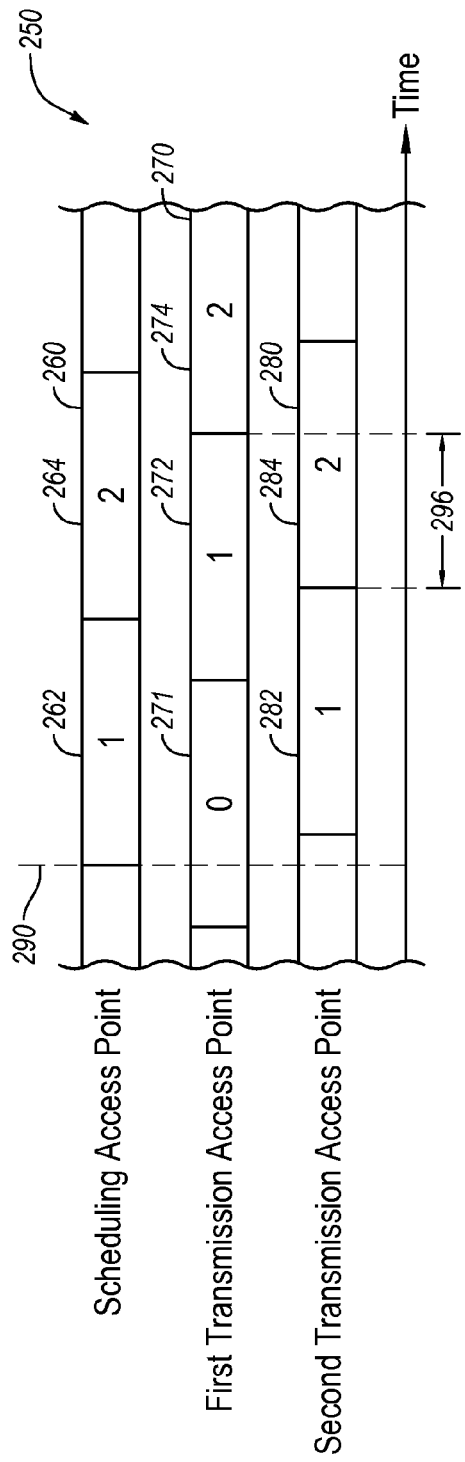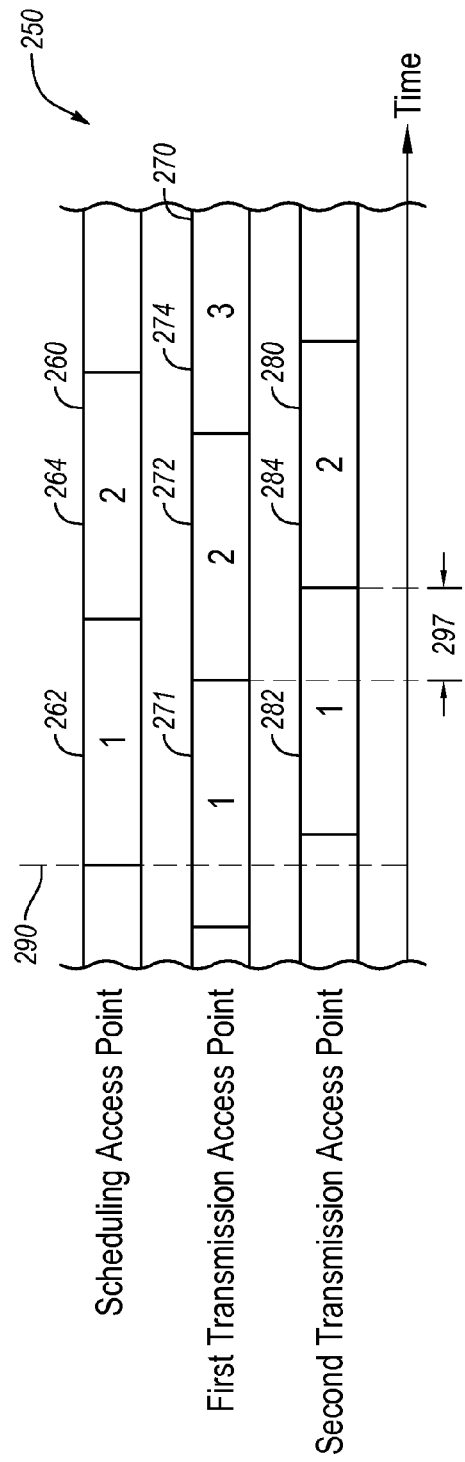

WIRELESS COMMUNICATION WITH MULTIPLE ACCESS POINTS

FIELD

The embodiments discussed herein are related to wireless communication with multiple access points.

BACKGROUND

The proliferation of smartphones, tablets, laptop computers, and other wireless devices that use wireless communication networks has created an increasing demand for ubiquitous and continuous wireless data access. To accommodate this demand, additional wireless access points, such as base stations, remote radio heads, and other devices have been deployed to allow for increased coverage area and increased frequency reuse within existing coverage areas. Increasing the frequency reuse within wireless communication networks provides for increased data transfers to wireless devices within the wireless communication networks. However, increasing the number of wireless access points to achieve the increased frequency reuse may be costly and may present various problems within the wireless communication networks.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a wireless device may include a receiver that may receive data transmission scheduling information from a first wireless communication access point and may receive data from a second wireless communication access point according to the data transmission scheduling information. The wireless device may also include a request generator that may generate a data transmission request based on the data transmission scheduling information and a transmitter that may transmit the data transmission request to the second wireless communication access point. The receiver may receive the data from the second wireless communication access point in response to the data transmission request.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 1A illustrates an example architecture of a multiple access point wireless communication system;

FIGS. 2B and 2C illustrates communication frames used in the multiple access point wireless communication system of FIG. 2A;

DESCRIPTION OF EMBODIMENTS

Figure 1B:
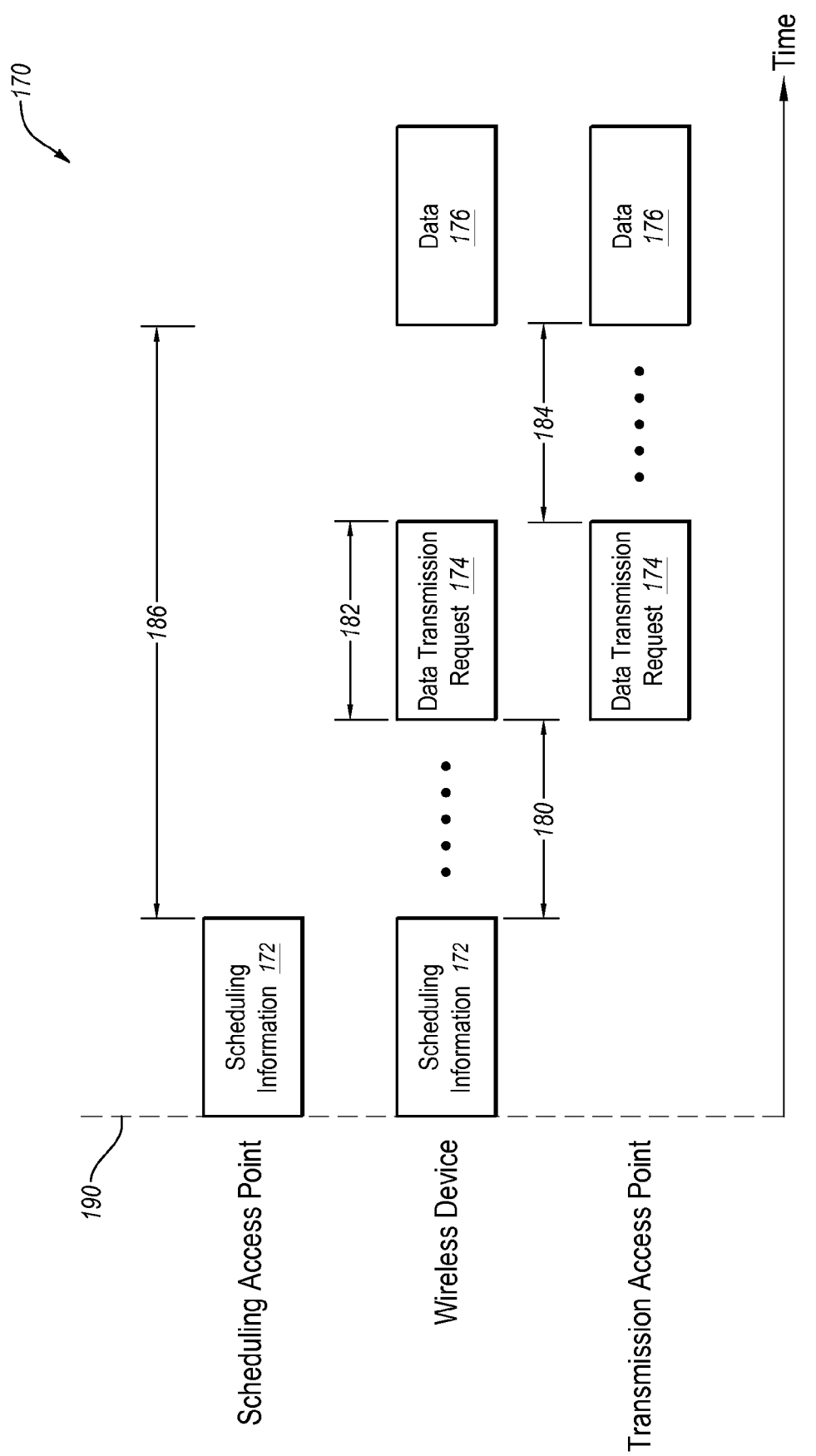
FIG. 1B illustrates communication sub-frames of data transmissions within the multiple access point wireless communication system of FIG. 1A.

Some embodiments described herein relate to wireless communication systems that employ multiple wireless communication access points ("access points") to communicate with wireless devices. In particular, some embodiments described herein relate to wireless communication systems where one access point is configured to schedule wireless data transmissions for a wireless device and another access point is configured to transmit the wireless data to the wireless device. In these and other embodiments, the one access point configured to schedule wireless data transmissions ("scheduling access point") and the another access point configured to transmit the wireless data ("transmission access point") may not be connected through a wired connection, such as an optical network or some other wired connection.

In lieu of the scheduling access point transmitting data transmission scheduling information directly to the transmission access point over a wireless and/or wired connection, in some embodiments described herein, the scheduling access point may transmit the data transmission scheduling information to the wireless device. The wireless device may be configured to generate a data transmission request based on the received data transmission scheduling information and to transmit the data transmission request to the transmission access point. In response to receiving the data transmission request, the transmission access point may transmit data, which is scheduled for transmission to the wireless device based on the data transmission scheduling information, to the wireless device.

In some embodiments, the wireless device may be further configured to generate and transmit a message to the scheduling access point indicating a status of reception of the data from the transmission access point. In some embodiments, the scheduling access point may also adjust the data transmission scheduling information for the transmission access point based on data transmission scheduling information for one or more access points neighboring the transmission access point. Alternately or additionally, the scheduling access point may also adjust the data transmission scheduling information for the transmission access point based on indications from the wireless device concerning timing of communication frames between the scheduling access point, the transmission access point, and other access points that have their data transmissions scheduled by the scheduling access point.

Embodiments of the present invention will be explained with reference to the accompanying drawings.

FIG. 1A illustrates an example architecture of a multiple access point wireless communication system ("wireless system") 100, arranged in accordance with at least some embodiments described herein. The wireless system 100 may be configured to provide wireless communication services to a wireless device 140 via one or more access points, such as a scheduling access point 110 and a transmission access point 120. The wireless communication services may be voice services, data services, messaging services, and/or any suitable combination thereof. The wireless system 100 may include a Code Division Multiple Access (CDMA) system, a Time Division Multiple Access (TDMA) system, a Frequency Division Multiple Access (FDMA) system, and/or some other wireless communication system. In some embodiments, the wireless system 100 may be configured as a third generation (3G) wireless communication system and/or a fourth generation (4G) wireless communication system. In these or other embodiments, the wireless system 100 may be configured as a long-term evolution (LTE) wireless communication system.

The wireless device 140 may include any device that may use the wireless system 100 for obtaining wireless communications services and may include, by way of example and not limitation, a cellular phone, a smartphone, a personal data assistant (PDA), a laptop computer, a personal computer, a tablet computer, or any other similar device.

The scheduling access point 110 and the transmission access point 120 may be any suitable wireless communication system access points and may include, by way of example but not limitation, a base station, a remote radio head (RRH), or any other suitable access point. The scheduling access point 110 and the transmission access point 120 may both be communicatively coupled through a wired connection to a network 160 through a gateway 150. The network 160 may be any type of network, including public networks, such as the Internet, private networks, and other types of networks. The scheduling access point 110 and the transmission access point 120 may receive data from the network 160 through the gateway 150.

The scheduling access point 110 may be configured to determine data transmission scheduling information for transmitting data to the wireless device 140 from the transmission access point 120. In general, data transmission scheduling information may be information regarding when a data transmission between the transmission access point 120 and the wireless device 140 may occur. A data transmission may be the transmission access point 120 transmitting data over a downlink data channel to the wireless device 140 or the transmission access point 120 receiving data from the wireless device 140 over an uplink data channel.

For example, in an LTE, 4G, and/or 3G wireless communication system, the data transmission scheduling information may indicate when the transmission access point 120 may transmit data from the network 160 over a physical downlink shared channel (PDSCH) to the wireless device 140. In particular, in an LTE, 4G, and/or 3G wireless communication system, the data transmission scheduling information may indicate a communication frame as well as a communication sub-frame(s) during which a data transmission between the transmission access point 120 and the wireless device 140 may occur. In some embodiments, in addition to indicating when data transmissions may occur, the data transmission scheduling information may also indicate what data is to be transmitted.

Other information besides data, such as control information, may be exchanged between the transmission access point 120 and the wireless device 140 on control channels or other non-data channels that may not be scheduled by the scheduling access point 110. For example, in an LTE, 4G, and/or 3G wireless communication system, the transmission access point 120 and the wireless device 140 may communicate over a physical downlink control channel (PDCCH) to communicate wireless system 100 control information, such as primary synchronization signals (PSS), secondary synchronization signals (SSS), or other control information.

In some embodiments, the scheduling access point 110 may also be configured to determine data transmission scheduling information for transmitting data to other wireless devices from the transmission access point 120 and/or from other transmission access points not illustrated. The scheduling access point 110 may further be configured to communicate with and to transmit data to the wireless device 140.

The transmission access point 120 may be configured to communicate with and to transmit data to the wireless device 140. In some embodiments, the transmission access point 120 may transmit data from the network 160 to the wireless device 140. For example, the transmission access point 120 may receive an email message from the network 160 and may transmit the email message to the wireless device 140. In these and other embodiments, the transmission access point 120 may transmit data to the wireless device 140 according to data transmission scheduling information determined by the scheduling access point 110.

The transmission access point 120 and the scheduling access point 110 may not be directly communicatively coupled by a wired connection, such as an optical network, a copper network, a coaxial network, or some other type of wired connection. Thus, the scheduling access point 110 may not transmit data transmission scheduling information directly to the transmission access point 120. Instead, the scheduling access point 110 may be configured to transmit the data transmission scheduling information to the wireless device 140. For example, in an LTE, 4G, and/or 3G wireless communication system, the scheduling access point 110 may transmit the data transmission scheduling information over the PDCCH to the wireless device 140.

The wireless device 140 may be configured to generate a data transmission request based on the received data transmission scheduling information from the scheduling access point 110. In general, the data transmission request may be a request for a data transfer between the wireless device 140 and the transmission access point 120 at the current time or at some time in the future. For example, in an LTE, 4G, and/or 3G wireless communication system, the data transmission request may indicate to the transmission access point 120 to begin transmitting data to the wireless device 140 at the next available communication sub-frame or to begin transmitting data to the wireless device 140 during an indicated communication sub-frame of this or another communication frame. In some embodiments, the data transmission request may indicate the data to be transmitted. Alternately or additionally, the data transmission request may not indicate the data to be transmitted but may indicate that previously indicated data is to be transmitted. The wireless device 140 may also be configured to transmit the data transmission request to the transmission access point 120.

The transmission access point 120 may be configured to receive the data transmission request from the wireless device 140. The transmission access point 120 may be further configured to act on the data transmission request. In some embodiments, in response to the data transmission request, the transmission access point 120 may transmit data to the wireless device 120. For example, in an LTE, 4G, and/or 3G wireless communication system, the transmission access point 120 may transmit data over the PDSCH to the wireless device 140. In this example, the transmission access point 120 may transmit the data at the first available communication sub-frame or during an indicated communication sub-frame of the current or next communication frame. Alternately or additionally, in response to the data transmission request, the transmission access point 120 may receive data from the wireless device 120.

In some embodiments, the scheduling access point 110 may transmit the data transmission scheduling information to the wireless device 140 over a first frequency channel and the data transmission between the wireless device 140 and the transmission access point 120 may occur over a second frequency channel. For example, in an LTE, 4G, and/or 3G wireless communication system, the scheduling access point 110 may transmit the data transmission scheduling information to the wireless device 140 over the PDCCH of the first frequency channel and the data transmission between the wireless device 140 and the transmission access point 120 may occur over the PDSCH of the second frequency channel.

The wireless device 140 may also be configured to generate a message indicating a status of reception of the data from the transmission access point 120. The status of reception of the data may indicate, for example, that the data has either been received or not received. When the data is not received during the designated communication sub-frame, the message may indicate that the data is not received. When the data is received, the message may indicate that the data is received. The wireless device 140 may be configured to transmit the message to the scheduling access point 110. For example, in an LTE, 4G, and/or 3G wireless communication system, the wireless device 140 may transmit over the PDCCH to the scheduling access point 110 an ACK signal when the data is received and an NACK signal when the data is not received.

Modifications, additions, or omissions may be made to the wireless system 100 without departing from the scope of the present disclosure. For example, the wireless system 100 may be configured to communicate with the wireless device 140 using a single frequency channel. Alternately or additionally, data transmissions between the scheduling access point 110 and the wireless device 140 and/or other wireless devices may occur. In some embodiments, the scheduling access point 110 and the transmission access point 120 may be directly communicatively coupled by a wired connection. In these and other embodiments, the scheduling access point 110 may transmit data transmission scheduling information to the wireless device 140 to avoid transmitting the data transmission scheduling information over the wired connection to the transmission access point 120 during certain times, such as when the wired connection is experiencing heavy data traffic.

FIG. 1B illustrates communication sub-frames 170 of data transmissions within the system 100 of FIG. 1A, arranged in accordance with at least some embodiments described herein. In particular, FIG. 1B illustrates timing of the communication sub-frames 170 for transmitting communications between the scheduling access point 110, the wireless device 140, and the transmission access point 120.

As illustrated, the scheduling access point 110 may be configured at time 190 to transmit the data transmission scheduling information to the wireless device 140 during a communication sub-frame 172. The wireless device 140 may receive the data transmission scheduling information during the communication sub-frame 172. In an LTE, 4G, and/or 3G wireless communication system, for example, the scheduling access point 110 may transmit the data transmission scheduling information over the PDCCH to the wireless device 140.

During a period 180, the wireless device 140 may be configured to decode the data transmission scheduling information and/or generate a data transmission request based on the received data transmission scheduling information. In an LTE, 4G, and/or 3G wireless communication system, for example, the period 180 may be equal to a duration of one to three communication sub-frames. In these and other embodiments, the communication sub-frames may be 1 millisecond. In some embodiments, the period 180 may be a set amount of time, for example, 1, 2, or 3 milliseconds.

The wireless device 140 may be configured to transmit the data transmission request to the transmission access point 120 during a communication sub-frame 174. The transmission access point 120 may be configured to receive the data transmission request during the communication sub-frame 174. The communication sub-frame 174 may last for a period 182. In an LTE, 4G, and/or 3G wireless communication system, for example, the period 182 may be 1 millisecond.

During a period 184, the transmission access point 120 may be configured to decode the data transmission request and/or gather and/or prepare to transmit data indicated in the data transmission request to the wireless device 140. In an LTE, 4G, and/or 3G wireless communication system, for example, the period 184 may be equal to a duration of one to three communication sub-frames. In these and other embodiments, the communication sub-frames may be 1 millisecond. In some embodiments, the period 180 may be a set amount of time, for example, 1, 2, or 3 milliseconds.

During a communication sub-frame 176, the transmission access point 120 may transmit the data to the wireless device 140 and the wireless device 140 may receive the data from the transmission access point 120. For example, in an LTE, 4G, and/or 3G wireless communication system, the transmission access point 120 may transmit data over the PDSCH to the wireless device 140.

A period 186 between the end of the communication sub-frame 172 and the beginning of the communication sub-frame 176 may be equal to a combination of the periods 180, 182, and 184. In some embodiments, the periods 180, 182, and 184 may be specified time periods. As such, the period 186 may be a specified time period. The scheduling access point 110 may be aware of the specified period 186 between when the data transmission scheduling information is transmitted to the wireless device 140 and the data is transmitted to the wireless device 140 from the transmitting access point 120. As a result, the scheduling access point 110 may determine when data should be transmitted to the wireless device 140 and may transmit the data transmission scheduling information to the wireless device 140 at a time equal to the period 186 before the data should be transmitted to the wireless device 140. Thus, the data transmission scheduling information may not explicitly include information about when to transmit the data. Rather, the scheduling access point 110 may use the transmission of the data transmission scheduling information to indicate the timing for transmitting the data to the wireless device 140 from the transmission access point 120. The scheduling access point 110 may use the period 186 to scheduling data transmissions between the wireless device 140 and the transmission access point 120 and to schedule non-conflicting data transmissions between other wireless devices and other transmission access points as described more fully with respect to FIGS. 2A-2C.

Figure 2A:
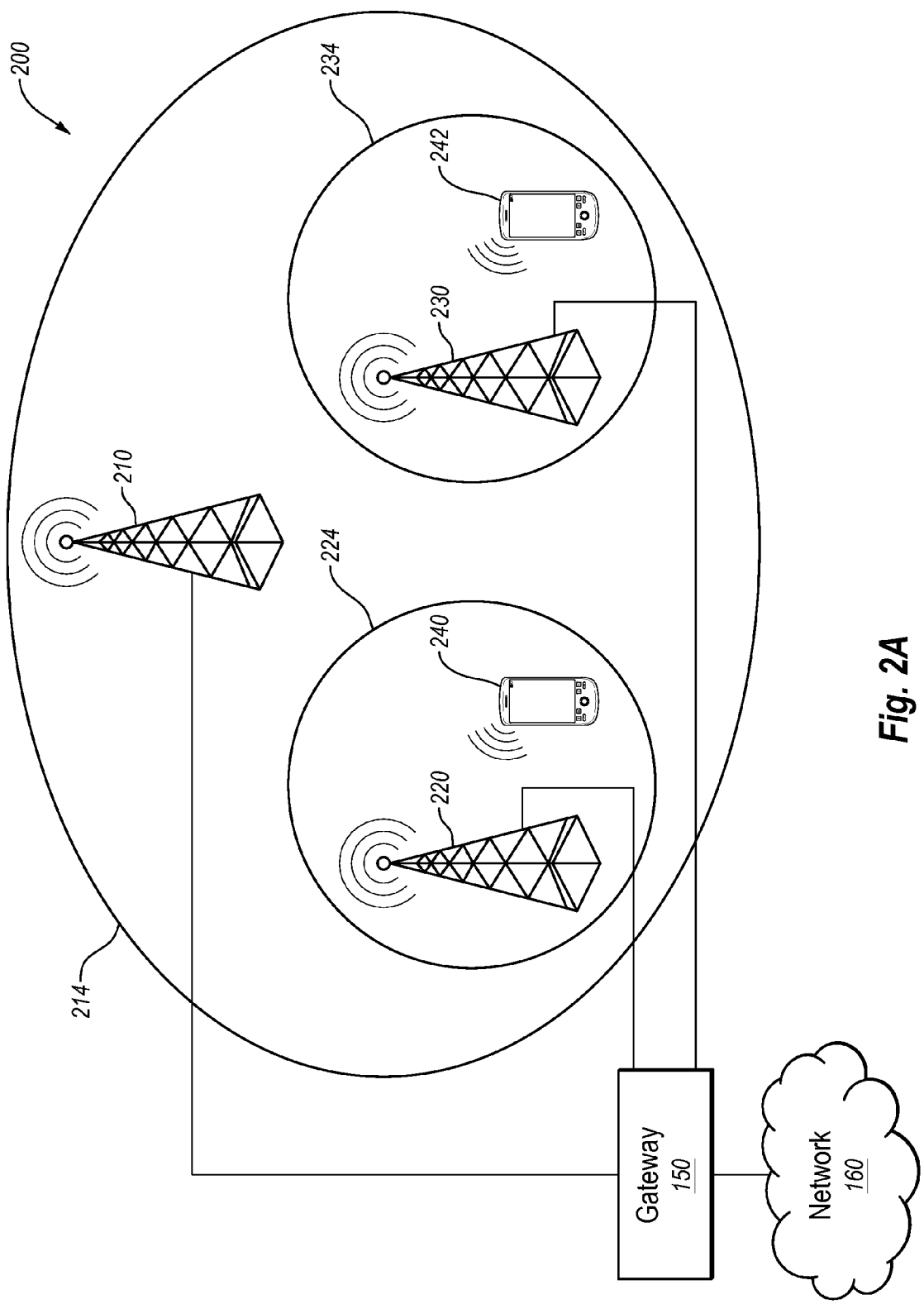
FIG. 2A illustrates an example architecture of another multiple access point wireless communication system.

FIG. 2A illustrates an example architecture of another multiple access point wireless communication system (wireless system) 200, arranged in accordance with at least some embodiments described herein. The wireless system 200 may include a scheduling access point 210, a first transmission access point 220, a second transmission access point 230, the gateway 150, and the network 160. In some embodiments, the wireless system 200 may include a first wireless device 240 and a second wireless device 242. The wireless system 200 may be configured to provide wireless communication services to the first and second wireless devices 240 and 242 via the access points 210, 220, 230. The wireless communication services may be voice services, data services, messaging services, and/or any suitable combination thereof. The wireless system 200 may include a Code Division Multiple Access (CDMA) system, a Time Division Multiple Access (TDMA) network, and/or some other wireless communication system. In some embodiments, the wireless system 200 may be configured as a third generation (3G) wireless communication system and/or a fourth generation (4G) wireless communication system. In these or other embodiments, the wireless system 200 may be configured as a long-term evolution (LTE) wireless communication system.

The scheduling access point 210, the first transmission access point 220, and the second transmission access point 230 may be communicatively coupled to the network 160 through the gateway 150 and may receive data through the network 160. The gateway 150 and the network 160 have been described above with respect to FIG. 1A, as such no further explanation is provided here.

The scheduling access point 210 may be similar to the scheduling access point 110 of FIG. 1A. The scheduling access point 210 may have a coverage area 214 in which the scheduling access point 210 provides wireless communication services to wireless devices, such as the wireless devices 240 and 242. The scheduling access point 210 may be configured to determine data transmission scheduling information for the first and second transmission access points 220 and 230.

The first transmission access point 220 may be similar to the transmission access point 120 of FIG. 1A. The first transmission access point 220 may have a coverage area 224 in which the first transmission access point 220 provides wireless communication services to wireless devices, such as the first wireless device 240. The first transmission access point 220 and the coverage area 224 may be located within the coverage area 214 of the scheduling access point 210.

The second transmission access point 230 may be similar to the transmission access point 120 of FIG. 1A. The second transmission access point 230 may have a coverage area 234 in which the second transmission access point 230 provides wireless communication services to wireless devices, such as the second wireless device 242. The second transmission access point 230 and the coverage area 234 may be located within the coverage area 214 of the scheduling access point 210.

Similar to the wireless system 100 of FIG. 1A, the scheduling access point 210 may transmit data transmission scheduling information to the first and second wireless devices 240 and 242. The first wireless device 240 may generate a data transmission request based on the received data transmission scheduling information and may transmit the data transmission request to the first transmission access point 220. In some embodiments, the first transmission access point 220 may transmit data to the first wireless device 240 in response to the received data transmission request. In these and other embodiments, the first transmission access point 220 may transmit the data over a data channel, such as the PDSCH in an LTE, 4G, and/or 3G wireless communication system.

Similarly, the second wireless device 242 may generate a data transmission request based on the received data transmission scheduling information and may transmit the data transmission request to the second transmission access point 230. In some embodiments, the second transmission access point 230 may transmit data to the second wireless device 242 in response to the received data transmission request. In these and other embodiments, the second transmission access point 230 may transmit the data over a data channel, such as the PDSCH in an LTE, 4G, and/or 3G wireless communication system.

In some embodiments, the first and second transmission access points 220 and 230 may establish data transmissions with wireless devices within their respective coverage areas 224 and 234 using a same frequency channel that differs from the frequency channel used by the scheduling access point 210. The first and second transmission access points 220 and 230 using the same frequency channel, i.e. frequency reuse, may allow for larger and/or more data transmissions within the coverage area 214 of the scheduling access point 210.

To avoid interference between data transmissions of the first and second transmission access points 220 and 230 when they use the same frequency channel, the scheduling access point 210 may not schedule the first and second transmission access points 220 and 230 for data transmissions during the same communication sub-frames of a communication frame. However, due to the data transmission scheduling information being transmitted to the wireless devices 240 and 242 and the wireless devices 240 and 242 requesting data transmissions from the respective first and second transmission access points 220 and 230, the communication sub-frames of the first and second transmission access points 220 and 230 may not be synchronized together and/or with the scheduling access point 210.

FIGS. 2B and 2C illustrate communication frames 250 used in the wireless system 200 of FIG. 2, arranged in accordance with at least some embodiments described herein. In particular, FIGS. 2B and 2C illustrate the non-synchronization between the communication frames 250 of the first and second transmission access points 220 and 230 and the scheduling access point 210.

As illustrated in FIGS. 2B and 2C, the scheduling access point 210 includes a communication frame 260 with communication sub-frames 262 and 264, numbered 1 and 2, respectively. The second transmission access point 230 includes a communication frame 280 with communication sub-frames 282 and 284, numbered 1 and 2, respectively. The first transmission access point 220 includes a communication frame 270 with communication sub-frames 271, 272, and 274. The communication sub-frames 271, 272, and 274 are numbered 0, 1, and 2, respectively in FIGS. 2B and 1, 2, and 3, respectively in FIG. 2C. Communication sub-frames with the same numbers may be considered corresponding communication sub-frames.

FIGS. 2B and 2C further illustrate a baseline 290 that corresponds with the communication frame 260 of the scheduling access point. The baseline 290 is the timing upon which the data transmission scheduling information is established. Ideally, corresponding communication sub-frames (i.e. communication sub-frames with the same numbers) within communication frames of the access points 210, 220, and 230 are synchronized. When the communication sub-frames of the access points 210, 220, and 230 are synchronized, the corresponding communication sub-frames begin and end at the same time.

In some embodiments, due to one or more factors, the communication sub-frames of the access points 210, 220, and 230 may not be synchronized. Non-synchronization of the communication sub-frames may result in errors in data transmissions between the access points 210, 220, and 230 and wireless devices. In particular, non-synchronization of communication sub-frames between the first and second transmission access points 220 and 230, when the first and second transmission access points 220 and 230 use the same frequency channel, may result in errors in data transmissions between the first and second transmission access points 220 and 230 and wireless devices. The errors in data transmissions may result because a data transmission of one of the first or second transmission access points 220 and 230 may interfere with the data transmission of another of the first or second transmission access points 220 and 230. For example, as illustrated in FIG. 2B, during communication sub-frame 272, numbered 1, the first transmission access point 220 may transmit data to the first wireless device 240. During the communication sub-frame 284, numbered 2, the second transmission access point 230 may transmit data to the second wireless device 242. As illustrated in FIG. 2B, the communication sub-frame 272 occurs during the communication sub-frame 284. As a result, the first and second transmission access points 220 and 230 are both transmitting data during the same period and may thus interfere with each other. As illustrated, the communication sub-frame 272 occurs during the communication sub-frame 284 over an overlap period 296.

The non-synchronization of the communication sub-frames of the first and second transmission access points 220 and 230 may be tolerated when a data transmission does not occur during one or more of the communication sub-frames. Alternately or additionally, the non-synchronization of the communication sub-frames of the first and second transmission access points 220 and 230 may be tolerated when a period of overlap of non-corresponding communication sub-frames during which data transmissions occur, such as the overlap period 296, is less than a maximum interference period. A maximum interference period may be determined based on the type of the wireless system 200. For example, in an LTE, 4G, and/or 3G wireless communication system, the communication sub-frames have a duration of 1 millisecond. In these and other embodiments, the maximum interference period may be about 0.5 milliseconds, for example.

Referring again to FIG. 2A, the wireless system 200 may be configured to compensate for the non-synchronization between the access points 210, 220, and 230 so that an overlap period of non-corresponding communication sub-frames, during which data transmission occurs, is less than a maximum interference period.

In some embodiments, the wireless system 200 may compensate for the non-synchronization, and thus an overlap period, between the access points 210, 220, and 230 by having the scheduling access point 210 not schedule data transmissions for the first and second transmission access points 220 and 230 that occur in adjacent communication sub-frames. Not scheduling data transmissions that occur in adjacent communication sub-frames may avoid overlap periods of non-corresponding communication sub-frames during which data transmissions occur. A number of buffering sub-frames that may be used between communication sub-frames during which data transmissions occur to avoid interference may depend on the maximum overlap period, i.e. amount of non-synchronization, that may occur. For example, assuming that a maximum overlap period for non-corresponding communication sub-frames of the first and second transmission access points 220 and 230 is smaller than one communication sub-frame, the scheduling access point 210 may avoid scheduling the first and second transmission access points 220 and 230 for data transmissions during subsequent communication sub-frames.

In some embodiments, the wireless system 200 may compensate for the non-synchronization between the access points 210, 220, and 230 by adjusting the numbering of the communication sub-frames of one or more of the access points 210, 220, and 230. The amount of adjustment to the numbering of the communication sub-frames may depend on the maximum overlap period, i.e. amount of non-synchronization, that may occur. For example, assuming that the non-synchronization results in a maximum overlap period for non-corresponding communication sub-frames of the first and second transmission access points 220 and 230 that is smaller than one communication sub-frame, the scheduling access point 210 may adjust the numbering of all the communication sub-frames of one or more communication frames of one of the first and second transmission access points 220 and 230 by one.

An example adjustment of the numbering of communication sub-frames is illustrated in the differences between FIGS. 2B and 2C. In FIG. 2B, in the communication frame 270 of the first transmission access point 220, the communication sub-frame 271 is numbered 0, the communication sub-frame 272 is numbered 1, and the communication sub-frame 274 is numbered 2. FIG. 2C illustrates an adjustment of the numbers of the communication sub-frames of the first transmission access point 220. Each of the communication sub-frames of the first transmission access point 220 are increased by one so that the communication sub-frame 271 is numbered 1, the communication sub-frame 272 is numbered 2, and the communication sub-frame 274 is numbered 3. By adjusting the numbering of the communication sub-frames of the communication frame 270, the communication sub-frame numbered 1 in the communication frame 270 is communication sub-frame 271, which no longer overlaps with communication sub-frame 284 numbered 2. Adjusting the numbering of the communication sub-frames of the communication frame 270 may also result in an adjustment overlap period 297 between communication sub-frame 282 numbered 1 and communication sub-frame 272 numbered 2. However, the adjustment overlap period 297 is smaller than the overlap period 296 and may be less than a maximum interference period to thereby reduce the possibility of data loss during a data transmission.

Referring again to FIG. 2A, the wireless system 200 may determine when to adjust the numbering of communication sub-frames for one or more of the access points 210, 220, and 230, based on a timing determination made by the first wireless device 240. In these and other embodiments, the first wireless device 240 may be configured to determine a first timing difference between communication frames of the scheduling access point 210 and communication frames of the first transmission access point 220 and to determine a second timing difference between communication frames of the scheduling access point 210 and communication frames of the second transmission access point 230.

The first wireless device 240 may determine the timing differences between the communication frames of the access points 210, 220, and 230 as explained above using a reference signal and other control signals and/or data signals of the wireless system 200 that the first wireless device 240 receives from the access points 210, 220, and 230. For example, in an LTE, 4G, and/or 3G wireless communication system, the first wireless device 240 may use a reference signal and PSS and SSS signals from the access points 210, 220, and 230 to determine the first and second timing differences.

In some embodiments, the first wireless device 240 may transmit the determined first and second timing differences to the scheduling access point 210. In these and other embodiments, the scheduling access point 210 may determine when an overlap period occurs between communication sub-frames of the first and second transmission access points 220 and 230 that is larger than a maximum interference period for the wireless system 200. When the overlap period is larger than the maximum interference period, the scheduling access point 210 may adjust the numbering of the communications sub-frames of one or more of the first and second transmission access points 220 and 230.

In some embodiments, the first wireless device 240 may determine when an overlap period occurs between communication sub-frames of the first and second transmission access points 220 and 230 that is larger than a maximum interference period for the wireless system 200. When the overlap period is larger than the maximum interference period, the first wireless device 240 may transmit a signal to the scheduling access point 210 indicating an adjustment is needed and an amount of adjustment. The scheduling access point 210 may then adjust the numbering of the communications sub-frames of one or more of the first and second transmission access points 220 and 230.

The first wireless device 240 may determine when an overlap period occurs by comparing the first and second timing differences to a specified threshold. The specified threshold may be determined based on a duration of the communication frames and/or sub-frames. For example, in an LTE, 4G, and/or 3G wireless communication system, the communication sub-frames may have a duration of 1 millisecond and the specified threshold may be half of the duration of the communication sub-frames or 0.5 milliseconds. In some embodiments, when one of the timing differences is larger than the specified threshold and the other timing difference is smaller than the specified threshold, the first wireless device 240 may indicate to the scheduling access point 210 to adjust the numbering of the communications sub-frames of one or more of the first and second transmission access points 220 and 230. Alternately or additionally, the first wireless device 240 may indicate to the scheduling access point 210 to adjust the numbering of the communications sub-frames of one or more of the first and second transmission access points 220 and 230 when a difference between the first and second timing differences is larger than a maximum interference period for the wireless system 200.

Modifications, additions, or omissions may be made to the wireless system 200 without departing from the scope of the present disclosure. For example, the wireless system 200 may include additional transmission access points that operate using the same frequency channel as the first and second transmission access points 220 and 230. In these and other embodiments, the scheduling access point 210 may adjust the schedules of one or more the first and second transmission access points 220 and 230 and the additional access points using the principles discussed above to reduce interference between the first and second transmission access points 220 and 230 and the additional access points. Alternately or additionally, the scheduling access point 210 and the first and second transmission access points 220 and 230 may operate using the same frequency channel. Alternately or additionally, the second wireless device 242 may determine the timing differences between the communication frames of the access points 210, 220, and 230 or each of the first and second wireless devices 240 and 242 may determine some, but not all, of the timing differences between the communication frames of the access points 210, 220, and 230.

Figure 3:
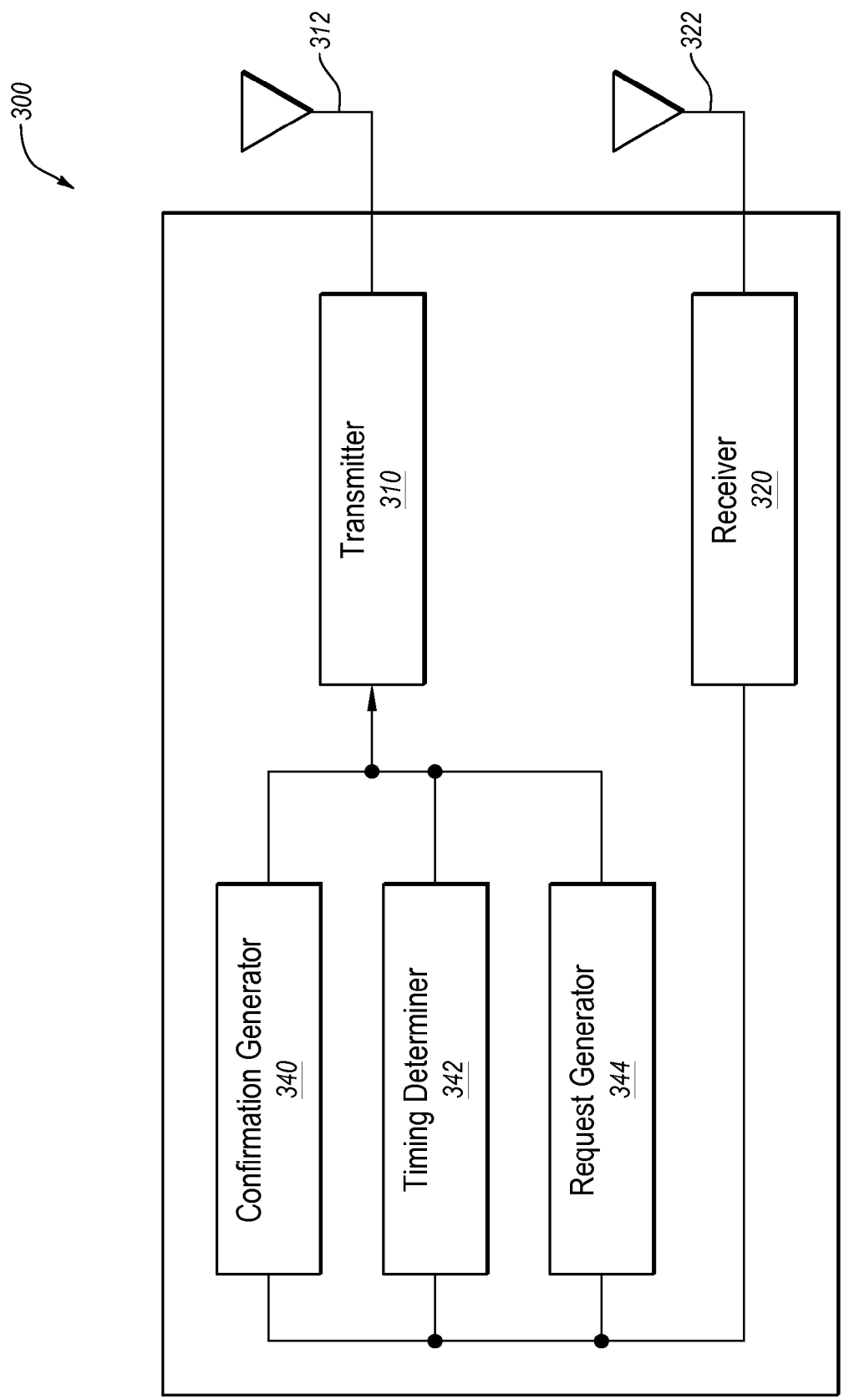
FIG. 3 is a block diagram of an example wireless device within a multiple access point wireless communication system.

FIG. 3 is a block diagram of an example wireless device 300, arranged in accordance with at least some embodiments described herein. The wireless device 300 may include any device that may use a wireless system for obtaining wireless communications services and may include, by way of example and not limitation, a cellular phone, a smartphone, a personal data assistant (PDA), a laptop computer, a personal computer, a tablet computer, or any other similar device. In general, the wireless device 300 may include a transmitter 310, a transmitting antenna 312, a receiver 320, a receiving antenna 322, a confirmation generator 340, a timing determiner 342, and a request generator 344.

The wireless device 300 may be used within a multiple access point wireless communication network, such as the wireless network 100 or 200 of FIGS. 1 and 2A, respectively. As such, the wireless device 300 may be configured to transmit and receive signals from a scheduling access point, a transmission access point, and other transmission access points, among other access points or wireless devices. In general, the wireless device 300 may be configured to operate similar to the wireless devices 140, 240, and 242 of FIGS. 1 and 2A, respectively.

By way of the receiving antenna 322, the receiver 320 of the wireless device 300 may be configured to receive signals from other objects, such as other wireless devices, access points, such as the scheduling access point, the transmission access point, other access points, and other objects. For example, the receiver 320 may be configured to receive data transmission scheduling information; timing signals, such as a PSS, a SSS, a reference signal, and other timing signals; data transmissions; and other signals. In some embodiments, the receiver 320 may be configured to decode received signals. In these and other embodiments, the receiver 320 may include one or more decoders. For example, the receiver 320 may include different decoders for control signals and data signals. Alternately or additionally, the receiver 320 may be configured to operate on different frequency channels.

The request generator 344 may be configured to receive data transmission scheduling information, generated at the scheduling access point, from the receiver 320 and to generate a data transmission request based on the received data transmission scheduling information. The data transmission request may indicate data to be transmitted to the wireless device 300 from the transmission access point at a specific communication sub-frame and/or at the next available communication sub-frame. In some embodiments, the data transmission request may indicate that data may be transmitted to the wireless device 300 without indicating the data. In these and other embodiments, the data may have been indicated previously.

By way of the transmitting antenna 312, the transmitter 310 may be configured to transmit signals to other objects, such as other wireless devices; access points, such as the scheduling access point, the transmission access point, other access points; and other objects. For example, the transmitter 310 may be configure transmit the data transmission request generated by the request generator 344 to the transmission access point.

In some embodiments, the transmitter 310 may be configured to encode signals before transmitting the signals. For example, the transmitter 310 may encode signals differently depending on whether the signal is a control signal or a data signal. Alternately or additionally, the transmitter 310 may be configured to operate on different frequency channels.

The confirmation generator 340 may be configured to generate a message indicating a status of reception of data at the receiver 320. In particular, the confirmation generator 340 may be configured to generate a message indicating a status of reception of data at the receiver 320 from the transmission access point in response to the transmitted data transmission request. The message may be transmitted by the transmitter 310 to a scheduling access point. In particular, the message may be transmitted to the scheduling access point that scheduled the data transmission from the transmission access point to the wireless device 300 that resulted in the wireless device 300 receiving or not receiving the data about which the message is generated.

The timing determiner 342 may be configured to determine a first timing difference between communication frames of the scheduling access point and communication frames of the transmission access point and to determine a second timing difference between communication frames of the scheduling access point and communication frames of another access point. The timing determiner 342 may determine the first and second timing differences based on signals received at the receiver 320. For example, the signals may be timing signals, such as a PSS, a SSS, and/or other reference signals.

In some embodiments, the timing determiner 342 may further be configured to generate a timing signal based on a difference between the first timing difference and the second timing difference, based on a difference between the first timing difference and a specified threshold and a difference between the second timing difference and the specified threshold; or based on some other factors. In some embodiments, the timing determiner 342 may generate the timing signal when the first timing difference is greater than a specified threshold and the second timing difference is less than the specified threshold. In these and other embodiments, the specified threshold may be based on a duration of communication frames or sub-frames used by the wireless device 300 to communicate with other objects within the wireless network. The timing signal may indicate adjustments that the scheduling access point may make to data transmission scheduling information for the transmission access point and/or the other access point(s). The transmitter 310 may be further configured to transmit the timing signal from the timing generator 342 to the scheduling access point.

Modifications, additions, or omissions may be made to the wireless device 300 without departing from the scope of the present disclosure. For example, the transmitter antenna 312 and the receiving antenna 322 may be the same antenna. Alternately or additionally, the transmitter antenna 312 may be multiple antennas and the receiving antenna 322 may be multiple antennas. Alternately or additionally, the wireless device 300 may include other modules such as a decoder separate from the receiver 320 and/or an encoder separate from the transmitter 310. Alternately or additionally, the wireless device 300 may include various other modules, such as a processor and/or memory as well as some other modules for performing operations related to the above disclosure or other operations.

Figure 4:
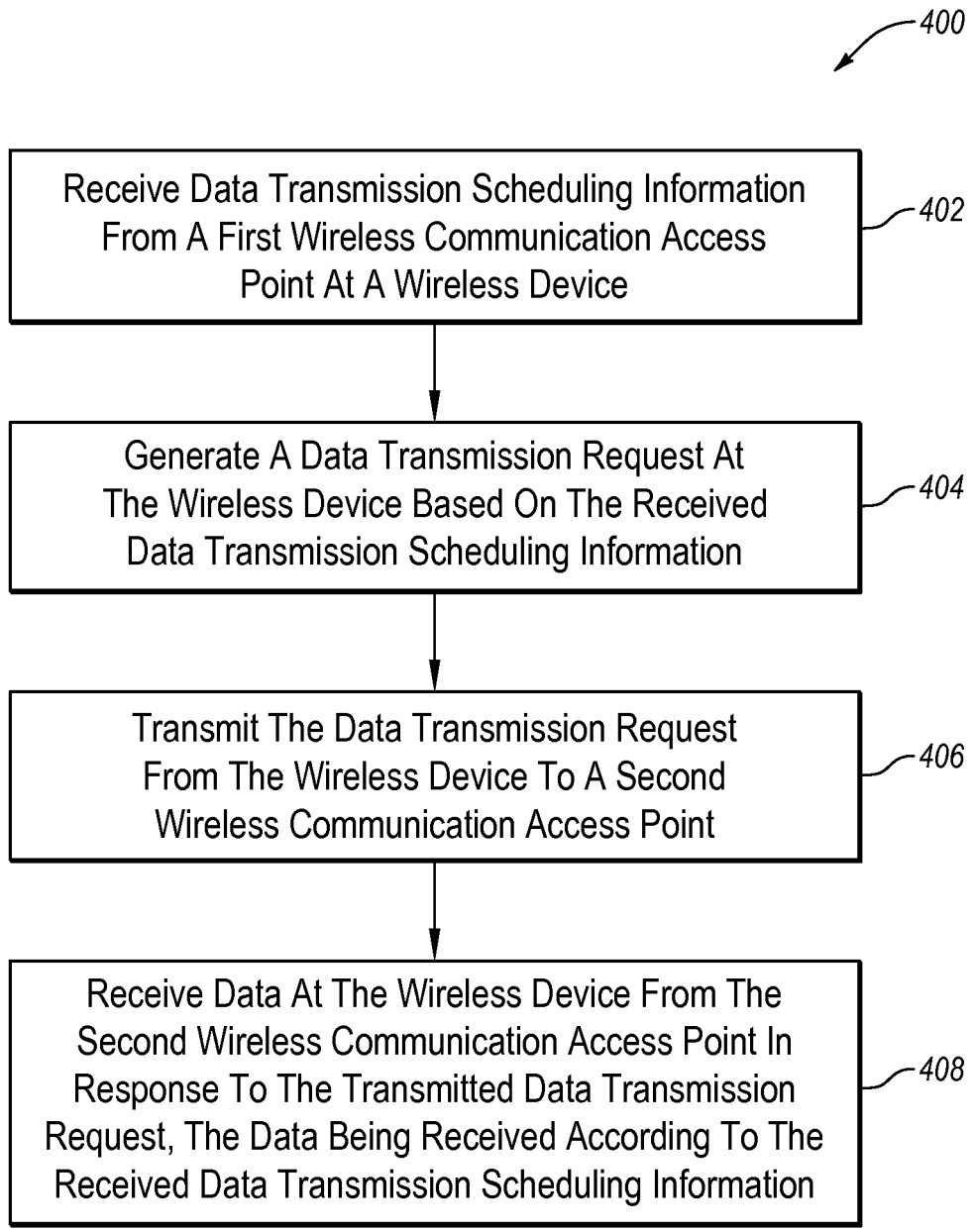
FIG. 4 is a flow chart of an example method of wireless communication.

FIG. 4 is a flow chart of an example method 400 of wireless communication, arranged in accordance with at least some embodiments described herein. The method 400 may be implemented, in some embodiments, by a wireless device, such as the wireless devices 140, 240, and 300 of FIGS. 1, 2A, and 3, respectively. The wireless device 300 may be part of a wireless communication network that includes a wireless communication access point for transmitting data to the wireless device 300 and a wireless communication access point that schedules data transmissions for the wireless device 300 and that transmits data transmission scheduling information to the wireless device. Although illustrated as discrete blocks, various blocks may be divided into additional blocks, combined into fewer blocks, or eliminated, depending on the desired implementation.

The method 400 may begin at block 402, where data transmission scheduling information may be received from a first wireless communication access point at a wireless device. In block 404, a data transmission request may be generated at the wireless device based on the received data transmission scheduling information.

In block 406, the data transmission request from the wireless device may be transmitted to a second wireless communication access point. In block 408, data may be received at the wireless device from the second wireless communication access point in response to the transmitted data transmission request. The data may be received according to the received data transmission scheduling information.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the method 400 may further include generating a message indicating a status of reception of the data from the second wireless communication access point and transmitting the message to the first wireless communication access point.

The method 400 may further include determining a first timing difference between communication frames of the first wireless communication access point and communication frames of the second wireless communication access point. The method 400 may also include determining a second timing difference between communication frames of the first wireless communication access point and communication frames of a third wireless communication access point. The method 400 may also include transmitting a timing signal to the first wireless communication access point based on differences between the first timing difference and a specified threshold and the second timing difference and the specified threshold.

Figure 5:
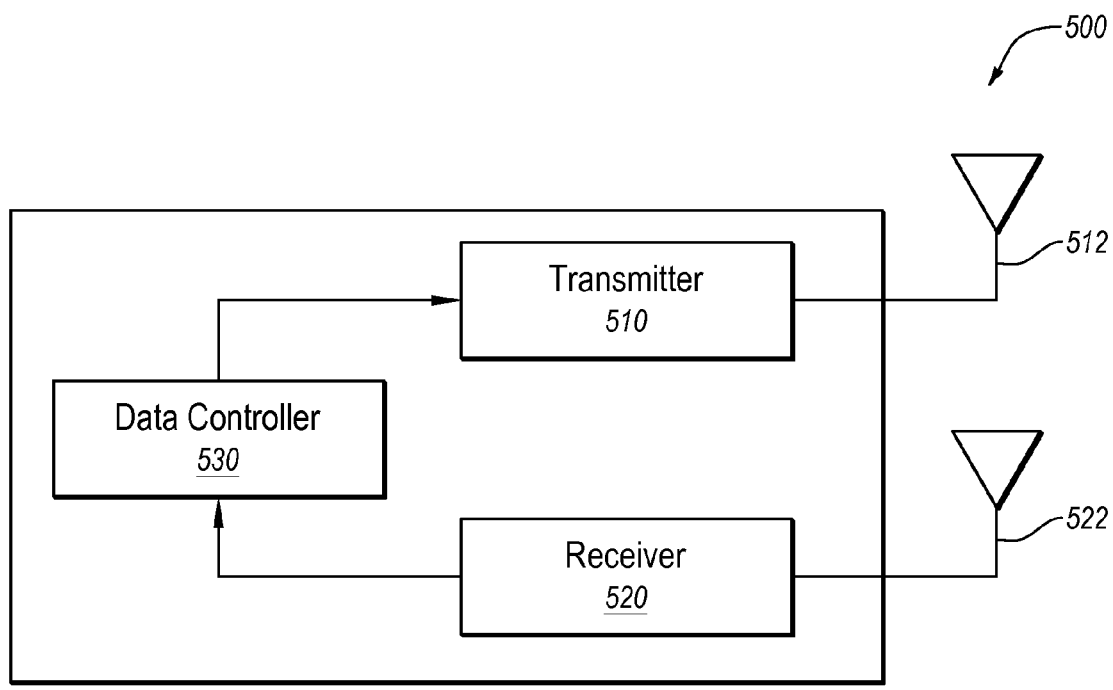
FIG. 5 is a block diagram of a transmission wireless communication access point.

FIG. 5 is a block diagram of a transmission wireless communication access point (transmission access point) 500, arranged in accordance with at least some embodiments described herein. The transmission access point 500 may be any suitable wireless communication system access point and may include, by way of example but not limitation, a base station, a remote radio head (RRH), or any other suitable access point. In general, the transmission access point 500 may include a transmitter 510, a transmitting antenna 512, a receiver 520, a receiving antenna 522, and a data controller 530.

The transmission access point 500 may be used within a wireless communication network, such as the wireless network 100 or 200 of FIGS. 1 and 2A, respectively. As such, the transmission access point 500 may be configured to transmit signals to and receive signals from a wireless device. In general, the transmission access point 500 may be configured to operate similar to the transmission access points 120 and 220 of FIGS. 1 and 2A, respectively.

By way of the receiving antenna 522, the receiver 520 of the transmission access point 500 may be configured to receive signals from other objects, such as wireless devices. For example, the receiver 520 may be configured to receive data transmission requests from the wireless devices. In some embodiments, the receiver 520 may include one or more decoders to decode received signals. For example, the receiver 520 may include different decoders for decoding control signals and data signals.

The data controller 530 may be configured to prepare data for transmitting to a wireless device based on a data transmission request received from the wireless device. In some embodiments, the data controller 530 may access the data from a network (not illustrated) such as the internet or other network. In some embodiments, the data controller 530 may have already accessed the data before receiving the data transmission request received from the wireless device. After receiving the data transmission request, the data controller 530 may transmit the data to the transmitter 510 for transmission to the wireless device according to the data transmission request.

By way of the transmitting antenna 512, the transmitter 510 may be configured to transmit signals to other objects, such as other wireless devices. For example, the transmitter 510 may be configured to transmit the data provided by the data controller 530 to the wireless device that transmitted the data transmission request. The transmitter 510 may be configured to transmit the data provided by the data controller 530 during the next available communication sub-frame or during a communication sub-frame designated in the data transmission request.

In some embodiments, the transmitter 510 may be configured to encode signals before transmitting the signals. For example, the transmitter 510 may encode signals differently depending on whether the signal is a control signal or a data signal. For example, in some embodiments, the transmitter 510 may transmit the data to the wireless device as a data signal and thus may encode the data as a data signal and transmit the encoded data over a data channel. Alternately or additionally, the transmitter 510 may be configured to operate on different frequency channels.

Modifications, additions, or omissions may be made to the transmission access point 500 without departing from the scope of the present disclosure. For example, the transmitting antenna 512 and the receiving antenna 522 may be the same antenna. Alternately or additionally, the transmitter antenna 512 may be multiple antennas and the receiving antenna 522 may be multiple antennas. Alternately or additionally, the transmission access point 500 may include other modules such as a decoder separate from the receiver 520 and/or an encoder separate from the transmitter 510. Alternately or additionally, the transmission access point 500 may include various other modules, such as a processor and/or memory as well as some other modules for performing operations related to the above disclosure or other operations.

Figure 6:
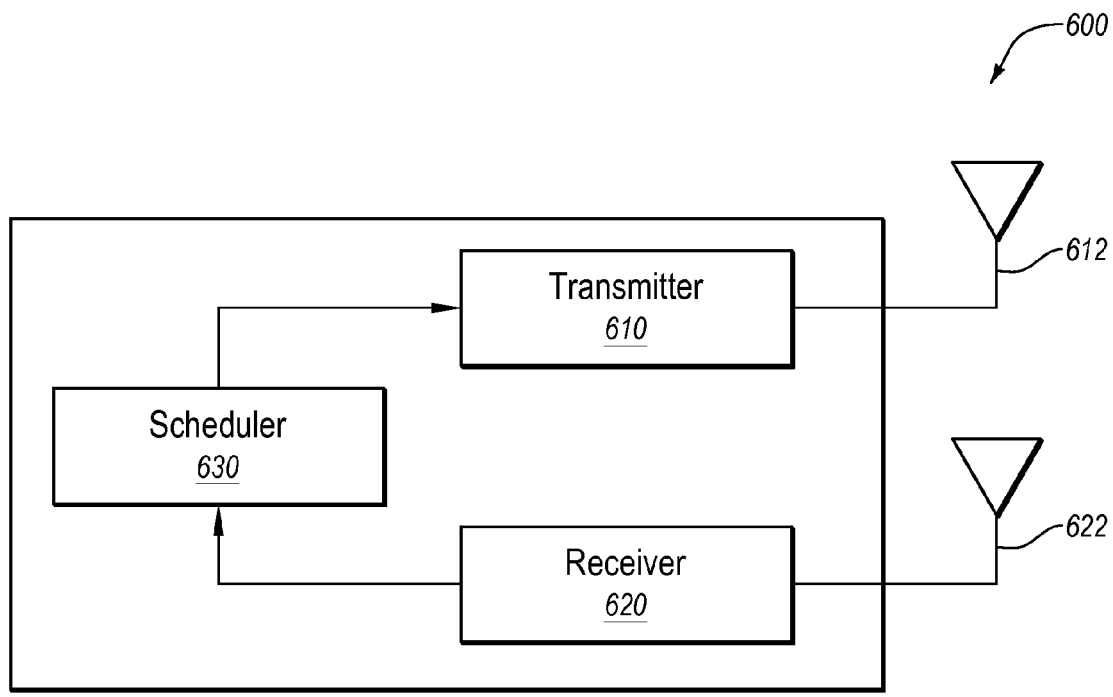
FIG. 6 is a block diagram of a scheduling wireless communication access point.

FIG. 6 is a block diagram of a scheduling wireless communication access point (scheduling access point) 600, arranged in accordance with at least some embodiments described herein. The scheduling access point 600 may be any suitable wireless communication system access point and may include, by way of example but not limitation, a base station, a remote radio head (RRH), or any other suitable access point. In general, the scheduling access point 600 may include a transmitter 610, a transmitting antenna 612, a receiver 620, a receiving antenna 622, and a scheduler 630.

The scheduling access point 600 may be used within a wireless communication network, such as the wireless network 100 or 200 of FIGS. 1 and 2A, respectively. As such, the scheduling access point 600 may be configured to transmit signals to and receive signals from a wireless device. In general, the scheduling access point 600 may be configured to operate similar to the scheduling access points 110 and 210 of FIGS. 1 and 2A, respectively.

By way of the receiving antenna 622, the receiver 620 may be configured to receive signals from other objects, such as wireless devices. For example, the receiver 620 may be configured to receive messages and/or timing signals from wireless devices. In some embodiments, the receiver 620 may include one or more decoders for decoding received signals. For example, the receiver 620 may include different decoders for received control signals and received data signals.

The scheduler 630 may be configured to determine data transmission scheduling information for access points within a multiple access point wireless communication network. The scheduler 630 may determine the data transmission scheduling information based on information received from wireless devices. For example, the scheduling access point 600 may receive a message from a wireless device indicating that data that the wireless device requested from an access point was not received. The scheduler 630 may adjust the data transmission scheduling information so that the access point re-transmits the data to the wireless device. As another example, the scheduling access point 600 may receive a timing signal from a wireless device indicating that the access point effecting data transmission with the wireless device is not synchronized with the data transmission scheduling information resulting in an overlap period between non-corresponding communication sub-frames of the access point and another access point. The scheduler 630 may be configured to adjust the data transmission scheduling information, for example by adjusting numbering of communication sub-frames for the access point effecting data transmission, to reduce the overlap.

By way of the transmitting antenna 612, the transmitter 610 may be configured to transmit signals to other objects, such as other wireless devices. For example, the transmitter 610 may be configured to transmit the data transmission scheduling information to wireless devices. In some embodiments, the transmitter 610 may be configured to encode signals before transmitting the signals. For example, the transmitter 610 may encode signals differently depending on whether the signal is a control signal or a data signal. For example, in some embodiments, the transmitter 610 may transmit the data transmission scheduling information to the wireless device as a control signal and thus may encode the data transmission scheduling information as a control signal and may transmit the encoded data transmission scheduling information over a control channel. Alternately or additionally, the transmitter 610 may be configured to operate on different frequency channels.

Modifications, additions, or omissions may be made to the scheduling access point 600 without departing from the scope of the present disclosure. For example, the transmitting antenna 612 and the receiving antenna 622 may be the same antenna. Alternately or additionally, the transmitting antenna 612 may be multiple antennas and the receiving antenna 622 may be multiple antennas. Alternately or additionally, the scheduling access point 600 may include other modules such as a decoder separate from the receiver 620 and/or an encoder separate from the transmitter 610. Alternately or additionally, the scheduling access point 600 may include various other modules, such as a processor and/or memory as well as some other modules for performing operations related to the above disclosure or other operations.

Figure 7:
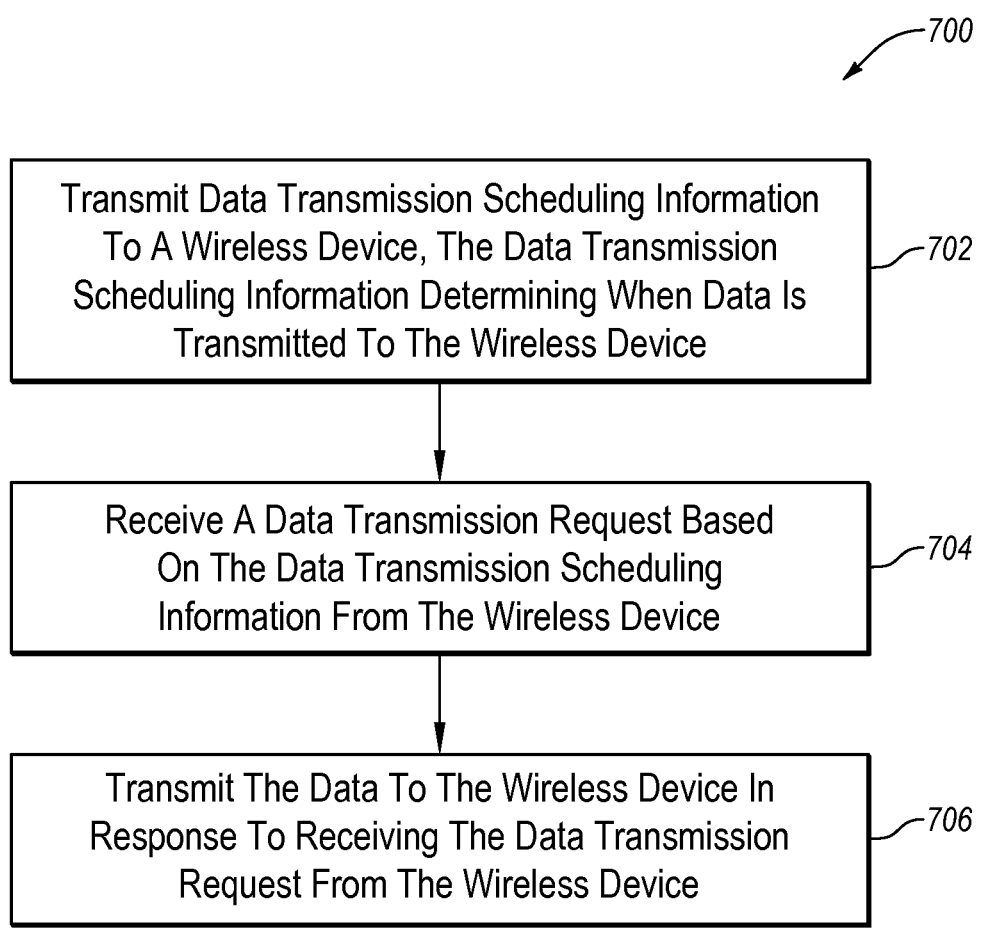
FIG. 7 is a flow chart of another example method of wireless communication.

FIG. 7 is a flow chart of another example method 700 of wireless communication, arranged in accordance with at least some embodiments described herein. The method 700 may be implemented, in some embodiments, by a multiple access point wireless communication system, such as the multiple access point wireless communication systems 100 and 200 of FIGS. 1 and 2A, respectively. Although illustrated as discrete blocks, various blocks may be divided into additional blocks, combined into fewer blocks, or eliminated, depending on the desired implementation.

The method 700 may begin at block 702, where data transmission scheduling information may be transmitted to a wireless device. The data transmission scheduling information may determine when data is transmitted to the wireless device. In some embodiments, the data transmission scheduling information may be transmitted by a scheduling access point.

In block 704, a data transmission request based on the data transmission scheduling information may be received from the wireless device. In block 706, the data may be transmitted to the wireless device in response to receiving the data transmission request from the wireless device. In some embodiments, the data transmission request may be received at and the data may be transmitted by a transmitting access point.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise tangible computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A mobile radio terminal comprising:
   a receiver of the mobile radio terminal, the receiver configured to:
      wirelessly receive data transmission scheduling information from a first base station, and
      wirelessly receive data from a second base station;
   a confirmation generator of the mobile radio terminal, the confirmation generator configured to generate a message indicating a status of reception of the data from the second base station;
   a request generator of the mobile radio terminal, the request generator configured to generate a data transmission request based on the data transmission scheduling information received from the first base station; and
   a transmitter of the mobile radio terminal, the transmitter configured to wirelessly transmit the data transmission request to the second base station, the second base station configured to schedule transmission of the data received by the mobile radio terminal using the data transmission request received from the mobile radio terminal, wherein the transmitter is configured to transmit the message to the first base station.

2. The mobile radio terminal of claim 1, further comprising a timing determiner of the mobile radio terminal, the timing determiner configured to:
   determine a first timing difference between first communication frames transmitted by the first base station and received at the receiver of the mobile radio terminal and second communication frames transmitted by the second base station and received at the receiver of the mobile radio terminal; and
   determine a second timing difference between the first communication frames transmitted by the first base station and received at the receiver of the mobile radio terminal and third communication frames transmitted by a third base station and received at the receiver of the mobile radio terminal.

3. The mobile radio terminal of claim 2, wherein the transmitter is further configured to transmit a timing signal to the first base station based on differences between the first timing difference and a specified threshold and the second timing difference and the specified threshold.

4. The mobile radio terminal of claim 3, wherein the timing signal is transmitted to the first base station when the first timing difference is greater than the specified threshold and the second timing difference is less than the specified threshold, wherein the specified threshold is based on a duration of the first, the second, or the third communication frames.

5. The mobile radio terminal of claim 1, wherein the receiver is configured to receive the data transmission scheduling information from the first base station over a first frequency channel and the transmitter is configured to transmit the data transmission request to the second base station over a second frequency channel.

6. The mobile radio terminal of claim 1, wherein the receiver receives the data from the second base station a specified period after the data transmission scheduling information is transmitted from the first base station.

7. A wireless communication system comprising:
a first base station configured to:
transmit data transmission scheduling information to a mobile radio terminal, the data transmission scheduling information determining when data is to be transmitted to the mobile radio terminal; and
receive a message from the mobile radio terminal, the message indicating a status of reception of the data at the mobile radio terminal from a second base station; and
the second base station configured to:
receive a data transmission request based on the data transmission scheduling information from the mobile radio terminal,
schedule a transmission of the data to the mobile radio terminal at a first time based on the data transmission request received from the mobile radio terminal, and
transmit the data to the mobile radio terminal at the first time as scheduled by the second base station based on the data transmission request received from the mobile radio terminal.

8. The wireless communication system of claim 7, wherein the first base station is configured to transmit the data transmission scheduling information to the mobile radio terminal over a first frequency channel and the second base station is configured to transmit the data to the mobile radio terminal over a second frequency channel.

9. The wireless communication system of claim 7, further comprising a third base station, wherein the first base station is further configured to schedule data transmissions by the second and the third base stations by directing the mobile radio terminal to send data transmission schedules to the second and the third base stations.

10. The wireless communication system of claim 7, wherein the data is transmitted to the mobile radio terminal from the second base station a specified period after the data transmission scheduling information is transmitted to the mobile radio terminal from the first base station.

11. The wireless communication system of claim 7, wherein the first base station is further configured to generate the data transmission scheduling information.

12. The wireless communication system of claim 11, wherein the first base station is further configured to receive a timing signal from the mobile radio terminal and to adjust the data transmission scheduling information based on the timing signal.

13. The wireless communication system of claim 12, wherein the first base station is configured to adjust the data transmission scheduling information by adjusting frame numbering of communication frames used for data transmission.

14. The wireless communication system of claim 12, wherein the timing signal is determined based on a first timing difference between communication frames of the first base station and communication frames of the second base station and a second timing difference between communication frames of the first base station and communication frames of a third base station.

15. The wireless communication system of claim 11, wherein the data transmission scheduling information is adjusted based on second data transmission scheduling information generated by the first base station for data transmissions between a second mobile radio terminal and a third base station.

16. A method of wireless communication, the method comprising:
wirelessly receiving, at a mobile radio terminal, data transmission scheduling information from a first base station configured to generate the data transmission scheduling information;
generating, at the mobile radio terminal, a data transmission request based on the received data transmission scheduling information;
wirelessly transmitting the data transmission request from the mobile radio terminal to a second base station;
wirelessly receiving, at the mobile radio terminal, data from the second base station, the second base station configured to schedule transmission of the data received by the mobile radio terminal using the data transmission request received from the mobile radio terminal; and
generating a message indicating a status of reception of the data from the second base station and transmitting the message to the first base station.

17. The method of claim 16, further comprising:
determining a first timing difference between communication frames of the first base station and communication frames of the second base station;
determining a second timing difference between communication frames of the first base station and communication frames of a third base station; and
transmitting a timing signal to the first base station based on differences between the first timing difference and a specified threshold and the second timing difference and the specified threshold.

18. The method of claim 16, wherein the data transmission scheduling information is received from the first base station over a first frequency channel and the data transmission request is transmitted to the second base station over a second frequency channel.

* * * * *